United States Patent
Hartle

(10) Patent No.: US 7,654,037 B2
(45) Date of Patent: Feb. 2, 2010

(54) METHOD TO IMPROVE PLANT SOMATIC EMBRYO GERMINATION FROM MANUFACTURED SEED

(75) Inventor: Jeffrey E. Hartle, Tacoma, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 578 days.

(21) Appl. No.: 11/402,119

(22) Filed: Apr. 10, 2006

(65) Prior Publication Data

US 2007/0000169 A1 Jan. 4, 2007

Related U.S. Application Data

(60) Provisional application No. 60/695,400, filed on Jun. 30, 2005.

(51) Int. Cl.
| A01C 1/00 | (2006.01) |
| A01G 7/00 | (2006.01) |
| A01H 4/00 | (2006.01) |
| A01C 1/06 | (2006.01) |
| A01C 21/00 | (2006.01) |

(52) U.S. Cl. .................... 47/58.1 SE; 47/57.6
(58) Field of Classification Search ................. 47/57.6, 47/58.1 SE
See application file for complete search history.

(56) References Cited

U.S. PATENT DOCUMENTS

| 2,309,702 | A | 2/1943 | Kirschenbaum |
| 2,502,809 | A | 4/1950 | Vogelsang |
| 2,809,772 | A | 10/1957 | Weisz |
| 3,098,320 | A | 7/1963 | Estkowski |
| 3,545,129 | A | 12/1970 | Schreiber et al. |
| 3,688,437 | A | 9/1972 | Hamrin |
| 3,690,034 | A | 9/1972 | Knapp |
| 3,734,987 | A | 5/1973 | Hamrin |
| 3,850,753 | A | 11/1974 | Chibata et al. |
| 4,147,930 | A | 4/1979 | Browne et al. |
| 4,166,006 | A | 8/1979 | Hertl et al. |
| 4,252,827 | A | 2/1981 | Yokoyama et al. |
| 4,465,017 | A | 8/1984 | Simmons |
| 4,562,663 | A | 1/1986 | Redenbaugh |
| 4,583,320 | A | 4/1986 | Redenbaugh |
| 4,615,141 | A | 10/1986 | Janick et al. |
| 4,628,633 | A | 12/1986 | Nilsson |
| 4,665,648 | A | 5/1987 | Branco et al. |
| 4,715,143 | A | 12/1987 | Redenbaugh et al. |
| 4,769,945 | A | 9/1988 | Motoyama et al. |
| 4,777,762 | A * | 10/1988 | Redenbaugh et al. ........ 47/57.6 |
| 4,777,907 | A | 10/1988 | Sänger |
| 4,779,376 | A | 10/1988 | Redenbaugh |
| 4,780,987 | A | 11/1988 | Nelsen et al. |
| 4,802,305 | A | 2/1989 | Kojimoto et al. |
| 4,802,905 | A | 2/1989 | Spector |
| 4,806,357 | A | 2/1989 | Garrett et al. |
| 4,808,430 | A | 2/1989 | Kouno |
| 4,866,096 | A | 9/1989 | Schweighardt |
| 4,879,839 | A | 11/1989 | Gago et al. |
| 5,010,685 | A | 4/1991 | Sakamoto et al. |
| 5,044,116 | A | 9/1991 | Gago et al. |
| 5,181,259 | A | 1/1993 | Rorvig |
| 5,183,757 | A | 2/1993 | Roberts |
| 5,236,469 | A | 8/1993 | Carlson et al. |
| 5,250,082 | A | 10/1993 | Teng et al. |
| 5,258,132 | A | 11/1993 | Kamel et al. |
| 5,284,765 | A | 2/1994 | Bryan et al. |
| 5,427,593 | A | 6/1995 | Carlson et al. |
| 5,451,241 | A | 9/1995 | Carlson et al. |
| 5,464,769 | A | 11/1995 | Attree et al. |
| 5,529,597 | A | 6/1996 | Iijima |
| 5,564,224 | A | 10/1996 | Carlson et al. |
| 5,565,355 | A | 10/1996 | Smith |
| 5,666,762 | A | 9/1997 | Carlson et al. |
| 5,680,320 | A | 10/1997 | Helmer et al. |
| 5,687,504 | A | 11/1997 | Carlson et al. |
| 5,732,505 | A | 3/1998 | Carlson et al. |
| 5,771,632 | A | 6/1998 | Liu et al. |
| 5,784,162 | A | 7/1998 | Carib et al. |
| 5,799,439 | A | 9/1998 | MacGregor |
| 5,821,126 | A | 10/1998 | Durzan et al. |

(Continued)

FOREIGN PATENT DOCUMENTS

CA       1241552       9/1988

(Continued)

OTHER PUBLICATIONS

Adlercreutz, P., and B. Mattiasson, "Oxygen Supply to Immobilized Biocatalysts. A Model Study," *Acta Chem. Scand.* B36:651-653, 1982.

Adlercreutz, P., and B. Mattiasson, "Oxygen Supply to Immobilized Cells: 1. Oxygen Production by Immobilized *Chlorella pyrenoidosa,*" *Enzyme Microbial Technol.* 4:332-336, 1982.

Adlercreutz, P., and B. Mattiasson, "Oxygen Supply to Immobilized Cells. 3. Oxygen Supply by Hemoglobin or Emulsions of Perfluorochemicals," *Eur. J. Appl. Microbiol. & Biotechnol.* 16:165-170, 1982.

Bapat, V.A., "Studies on Synthetic Seeds of Sandalwood (*Santalum album L.*) and Mulberry (*Morus indica L.*)," in K. Redenbaugh (ed.), *Synseeds: Applications of Synthetic Seeds to Crop Improvement,* CRC Press, Inc., Boca Raton, Fla., 1993, pp. 381-407.

(Continued)

*Primary Examiner*—Michael R Mansen
*Assistant Examiner*—Monica L Williams
(74) *Attorney, Agent, or Firm*—Christensen O'Connor Johnson Kindness PLLC

(57) ABSTRACT

The invention provides methods for improving germination of manufactured seeds. In some embodiments, the methods comprise the steps of (a) incubating a plant somatic embryo under suitable conditions for reducing the size of the embryo to produce a compact plant somatic embryo and (b) assembling the compact plant somatic embryo of step (a) into a manufactured seed.

5 Claims, No Drawings

U.S. PATENT DOCUMENTS

| | | | |
|---|---|---|---|
| 5,842,150 | A | 11/1998 | Renberg et al. |
| 5,877,850 | A | 3/1999 | Ogata |
| 5,930,803 | A | 7/1999 | Becker et al. |
| 5,960,435 | A | 9/1999 | Rathmann et al. |
| 6,021,220 | A | 2/2000 | Anderholm |
| 6,092,059 | A | 7/2000 | Straforini et al. |
| 6,119,395 | A | 9/2000 | Hartle et al. |
| 6,145,247 | A | 11/2000 | McKinnis |
| 6,567,538 | B1 | 5/2003 | Pelletier |
| 6,582,159 | B2 | 6/2003 | McKinnis |
| 6,684,564 | B1 | 2/2004 | Hirahara |
| 6,931,787 | B2 | 8/2005 | Hirahara |
| 2002/0192686 | A1 | 12/2002 | Adorjan et al. |
| 2003/0055615 | A1 | 3/2003 | Zhang et al. |
| 2005/0108936 | A1 | 5/2005 | Carlson et al. |
| 2005/0150161 | A1 | 7/2005 | Carlson et al. |

FOREIGN PATENT DOCUMENTS

| | | |
|---|---|---|
| CA | 1250296 | 2/1989 |
| EP | 0 107 141 A1 | 5/1984 |
| EP | 0 300 730 A1 | 1/1989 |
| EP | 0 380 692 A1 | 8/1990 |
| EP | 0776601 | 6/1997 |
| JP | 61040708 | 2/1986 |
| JP | 62275604 | 11/1987 |
| JP | 63133904 | 6/1988 |
| JP | 63152905 | 6/1988 |
| JP | 2-46240 | 2/1990 |
| JP | 407179683 A | 7/1995 |
| WO | WO 91/00781 A1 | 1/1991 |
| WO | WO 91/01803 | 2/1991 |
| WO | WO 92/07457 A1 | 5/1992 |
| WO | WO 95/05064 | 2/1995 |
| WO | WO 98/33375 | 8/1998 |
| WO | WO 99/26470 | 6/1999 |

OTHER PUBLICATIONS

Bapat, V.A., and P.S. Rao, "In Vivo Growth of Encapsulated Axillary Buds of Mulberry (*Morus indica L.*),"*Plant Cell, Tissue and Organ Culture* 20:69-70, 1990.

Bapat, V.A., and P.S. Rao, "Sandalwood Plantlets from 'Synthetic Seeds,'" *Plant Cell Reports* 7:434-436, 1988.

Buchenauer, H., "Mode of Action and Selectivity of Fungicides Which Interfere with Ergosterol Biosynthesis," *Proceedings of the 1977 British Crop Protection Conference—Pests and Diseases*, Brighton, U.K., 1977, pp. 699-711.

Chandler, D., et al., "Effects of Emulsified Perfluorochemicals on Growth and Ultrastructure of Microbial Cells in Culture," *Biotechnol. Letters* 9(3):195-200, 1987.

Cheng, Z., and P.P. Ling, "Machine Vision Techniques for Somatic Coffee Embryo Morphological Feature Extraction," *American Society of Agricultural Engineers* 37(5):1663-1669, 1994.

Chi, C.-M., et al., "An Advanced Image Analysis System for Evaluation of Somatic Embryo Development," *Biotechnology and Bioengineering* 50:65-72, Apr. 1996.

Clark, Jr., L.C., et al., "Emulsions of Perfluoronated Solvents for Intravascular Gas Transport," *Fed. Proceed.* 34(6):1468-1477, 1975.

Clark, Jr., L.C., et al., "The Physiology of Synthetic Blood," *J.Thorac. & Cardiovasc. Surg.* 60(6):757-773, 1970.

Damiano, D., and S.S. Wang, "Novel Use of Perfluorocarbon for Supplying Oxygen to Aerobic Submerged Cultures," *Biotechnol. Letters* 7(2):81-86, 1985.

Datta, S.K., and I. Potrykus, "Artifical Seeds in Barley: Encapsulation of Microspore-Derived Embryos," *Thero. Appl. Genet.* 77:820-824, 1989.

Dumet, D., et al., "Cryopreservation of Oil Palm (*Elaeis guincesis Jacq.*) Somatic Embryos Involving a Desiccation Step," *Plant Cell Reports* 12:352-355, 1993.

Dupuis, J.-M., et al., "Pharmaceutical Capsules as a Coating System for Artificial Seeds," *Bio/Technol.* 12:385-389, 1994.

Ebert, W.W., and P.F. Knowles, "Inheritance of Pericarp Types, Sterility, and Dwarfness in Several Safflower Crosses," *Crop Science* 6:579-582, 1966.

Fujii, A., et al., "Artificial Seeds for Plant Propagation," *Trends in Bio/Technol.* 5:335-339, 1987.

Fujii, J., et al., "ABA Maturation and Starch Accumulation in Alfalfa Somatic Embryos" (Abstract), In Vitro 25 (3, Part 2):61A, 1989.

Fujii, J., et al., "Improving Plantlet Growth and Vigor From Alfalfa Artificial Seed" (Abstract), In Vitro 24 (3, Part 2):70A, 1989.

Fujita, T., et al., "Fluorocarbon Emulsion as a Candidate for Artificial Blood," *Europ. Surg. Res.* 3:436-453, 1971.

Geyer, R.P., "'Bloodless' Rats Through the Use of Artificial Blood Substitutes," *Fed. Proceed* 34(6):1499-1505, 1975.

Gray, D.J., and A. Purohit, "Somatic Embryogenesis and Development of Synthetic Seed Technology," *Crit. Rev. Plant Sci.* 10(1):33-61, 1991.

Grob, J.A., et al., "Dimensional Model of Zygotic Douglas-Fir Embryo Development," *International Journal of Plant Sciences* 160(4):653-662, 1999.

Gupta, P.K., and D.J. Durzan, "Biotechnology of Somatic Polyembryogenesis and Plantlet Regeneration in Loblolly Pine," *Bio/Technol.* 5:147-151, 1987.

Ibarbia, E.A., "Synthetic Seed: Is It the Future," *Western Grower and Shipper* 59:12, 1988.

Janick, J., "Production of Synthetic Seed via Desiccation and Encapsulation" (Abstract), In Vitro 24 (3, Part 2):70A, 1989.

Kamada, H., et al., "New Methods for Somatic Embryo Induction and Their Use of Synthetic Production" (Abstract), In Vitro 24(3, Part 2):71A, 1988.

Kim YH, "ABA and Polyox-Encapsulation or High Humidity Increases Survival of Desiccated Somatic Embryos of Celery," *HortScience* 24(4):674-676, 1989.

King, A.T., et al., "Perfluorochemicals and Cell Culture," *Biotechnol.* 7:1037-1042, 1989.

Kitto, S.L., and J. Janick, "A Citrus Embryo Assay to Screen Water-Soluble Resins as Synthetic Seed Coats," *HortScience* 20(1):98-100, 1985.

Kitto, S.L., and J. Janick, "Production of Synthetic Seeds by Encapsulating Asexual Embryos of Carrot," *J. Amer. Soc. Hort. Sci.* 110(2):277-282, 1985.

Li, X.-Q., "Somatic Embryogenesis and Synthetic Seed Technology Using Carrot as a Model System," in K. Redenbaugh (ed.), *Synseeds: Applications of Synthetic Seeds to Crop Improvement*, CRC Press, Inc., Boca Raton, Fla., 1993, pp. 289-304.

Mattiasson, B., and P. Adlercreutz, "Use of Perfluorochemicals for Oxygen Supply to Immobilized Cells," *Ann. N.Y. Acad. Sci.* 413:545-547, 1984.

Paulet, F., et al., "Cryopreservation of Apices of In Vitro Plantlets of Sugarcane (*Saccharum* sp. Hybrids) Using Encapsulation/Dehydration," *Plant Cell Reports* 12:525-529, 1993.

Redenbaugh, K., et al., "Encapsulated Plant Embryos," *Biotechnology in Agriculture*, 1988, pp. 225-248.

Redenbaugh, K., et al., "Encapsulation of Somatic Embryos for Artificial Seed Production" (Abstract), In Vitro 20(2):256-257, 1984.

Redenbaugh, K., et al., "Encapsulation of Somatic Embryos in Synthetic Seed Coats," *HortScience* 22(5):803-809, 1987.

Redenbaugh, K., et al., "III.3 Artificial Seeds—Encapsulated Somatic Embryos," *Biotech. in Agr. & For.* 17:395-416, 1991.

Redenbaugh, K., et al., "Scale-Up: Artificial Seeds," in Green et al. (eds.), *Plant Tissue and Cell Culture*, Alan R. Liss, Inc., New York, 1987, pp. 473-493.

Redenbaugh, K., et al., "Somatic Seeds: Encapsulation of Asexual Plant Embryos," *Bio/Technology* 4:797-801, 1986.

Riess, J.G., and M. Le Blanc, "Perfluoro Compounds as Blood Substitutes," *Angew. Chem. Int. Ed. Engl.* 17(9):621-634, 1978.

Rogers, M., "Synthetic-Seed Technology," *Newsweek*, Nov. 28, 1983.

Sanada, M., et al., "Celery and Lettuce," in M.K. Redenbaugh (ed.), *Synseeds: Applications of Synthetic Seeds to Crop Improvement*, CRC Press, Inc., Boca Raton, Fla., 1993, pp. 305-322.

Senaratna, T., "Artificial Seeds," *Biotech Adv.* 10(3)379-392, 1992.

Sharma SK et al., "Novel Compositions of Emulsified Perfluorocarbons for Biological Applications," *Brit. J. Pharmacol.* 89:665P, 1986.

Stuart, D.A., and M.K. Redenbaugh, "Use of Somatic Embryogenesis for the Regeneration of Plants," in H.M. LeBaron et al. (eds.), *Biotechnology in Agricultural Chemistry*, American Chemical Society, Washington, D.C., 1987, pp. 87-96.

Teasdale, R.D., and P.A. Buxton, "Culture of *Pinus radiata* Embryos With Reference to Artificial Seed Production," *New Zealand J. For. Sci.* 16(3):387-391, 1986.

Tessereau, H. et al., "Cryopreservation of Somatic Embryos: A Tool for Germplasm Storage and Commercial Delivery of Selected Plants," *Ann. Bot.* 74:547-555, 1994.

Timmis, R., "Bioprocessing for Tree Production in the Forest Industry: Conifer Somatic Embryogenesis," *Biotechnology Progress* 14(1):156-166, 1998.

Weyerhaeauser, G.H., "Biotechnology in Forestry: The Promise and the Economic Reality" *Solutions! for People, Processes and Paper* 86(10):28-30, Oct. 2003.

* cited by examiner

METHOD TO IMPROVE PLANT SOMATIC EMBRYO GERMINATION FROM MANUFACTURED SEED

CROSS REFERENCE TO RELATED APPLICATION

The present application claims the benefit of U.S. Provisional Application No. 60/695,400, filed Jun. 30, 2005.

FIELD OF THE INVENTION

The invention relates to improving the germination of manufactured seeds containing plant somatic embryos.

BACKGROUND OF THE INVENTION

It is often desirable to plant large numbers of genetically identical plants that have been selected to have advantageous properties, but in many cases it is not feasible to produce such plants using standard breeding techniques. In vitro culture of somatic or zygotic plant embryos can be used to produce large numbers of genetically identical embryos that have the capacity to develop into normal plants. However, the resulting embryos lack the protective and nutritive structures found in natural botanic seeds that shelter the plant embryo inside the seed from the harsh soil environment and nurture the embryo during the critical stages of sowing and germination. Attempts have been made to provide such protective and nutritive structures by using manufactured seeds, but so far germination from manufactured seeds is less successful than from natural seeds.

There is a need for an improved manufactured seed that more closely mimics the function of natural seeds to provide a large number of normal germinants. The present invention addresses this and other needs.

SUMMARY OF THE INVENTION

The invention provides methods for improving germination of manufactured seeds. In some embodiments, the methods comprise the steps of (a) incubating a plant somatic embryo under suitable conditions for reducing the size of the embryo to produce a compact plant somatic embryo and (b) assembling the compact plant somatic embryo of step (a) into a manufactured seed. In step (a), the length and/or the width of the plant embryos may be reduced by about 10% to 50%.

In some embodiments, step (a) comprises desiccating the plant somatic embryos. The moisture content of the compact plant embryos produced in step (a) may be above 60%. In some embodiments, the plant embryo is a conifer embryo, for example, a loblolly pine embryo.

DETAILED DESCRIPTION OF THE PREFERRED EMBODIMENT

Unless specifically defined herein, all terms used herein have the same meaning as they would to one skilled in the art of the present invention.

Unless stated otherwise, all concentration values that are expressed as percentages are weight per volume percentages.

The invention provides methods for improving the germination of plant somatic embryos from manufactured seeds. The methods comprise the steps of (a) incubating a plant somatic embryo under suitable conditions for reducing the size of the embryo to produce a compact embryo and (b) assembling the compact plant somatic embryo of step (a) into a manufactured seed. In step (a) of the methods of the invention, plant somatic embryos are incubated under suitable conditions for reducing the size of the embryo to produce a compact embryo. As used herein, "a plant somatic embryo" refers to a plant embryo produced by culturing totipotent plant cells such as meristematic tissue under laboratory conditions in which the cells comprising the tissue are separated from one another and urged to develop into minute complete embryos. Alternatively, somatic embryos can be produced by inducing "cleavage polyembryogeny" of zygotic embryos. The methods of the invention are applicable to any plant embryos, including, but not limited to, conifer embryos. Methods for producing conifer somatic embryos suitable for use in the methods of the invention are standard in the art and have been previously described (see, e.g., U.S. Pat. Nos. 4,957,866; 5,034,326; 5,036,007; 5,041,382; 5,236,841; 5,294,549; 5,482,857; 5,563,061; and 5,821,126). For example, plant tissue may be cultured in an initiation medium that includes hormones to initiate the formation of embryogenic cells, such as embryonic suspensor masses that are capable of developing into somatic embryos. The embryogenic cells may then be further cultured in a maintenance medium that promotes establishment and multiplication of the embryogenic cells. Subsequently, the multiplied embryogenic cells may be cultured in a development medium that promotes the development of somatic embryos, which may further be subjected to post-development treatments such as cold treatments. The somatic embryos used in the methods of the invention have completed the development stage of the somatic embryogenesis process. They may also have been subjected to one or more post-development treatments.

According to the methods of the invention, the plant somatic embryos are incubated under suitable conditions for reducing the size of the embryos to produce compact somatic embryos. The "size" of an embryo refers to any spatial dimension of the embryo, including, but not limited to, its length or width. The term "compact somatic embryo" refers to an embryo in which at least one spatial dimension has been reduced or diminished compared to the original spatial dimension of the embryo. In some embodiments, the size of the embryos is reduced by about 10% to 50% (such as by about 15% to 40% or by about 20% to 30%) of the original size. For example, the length and/or the width of the embryos may be reduced by about 10% to 50% (such as by about 15% to 40% or by about 20% to 30%) of the original length and/or width. In some embodiments, the length and width of the embryos are reduced by about 25% of the original length and width, as described in EXAMPLE 2.

Suitable conditions for reducing the size of the plant somatic embryos are conditions under which the size of the embryos are reduced without affecting the viability of the embryos. For example, the embryos may be incubated under conditions that will effect a reduction in water content of the embryos to produce compact embryos. In some embodiments, the moisture content of the compact embryos produced according to step (a) of the methods of the invention is above 60% (such as between about 61% and 90% or between about 70% and 80%), as described in EXAMPLE 2. In some embodiments, the moisture content of the compact embryos produced according to step (a) of the methods of the invention is between about 8% and 60%.

In some embodiments, suitable conditions for reducing the size of the plant somatic embryos to produce compact embryos include incubating the somatic embryos at a humidity of between about 90% and about 99.5% (such as between about 95% and about 99.5% or between about 98% and about 99%) and a temperature between about 1° C. and about 30° C.

(such as between about 5° C. and about 25° C. or between about 20° C. and about 24° C.) for between about 1 day and about 21 days (such as between about 7 days and about 20 days or between about 14 days and about 19 days). Exemplary conditions for producing compact loblolly pine somatic embryos are provided in EXAMPLE 2.

Typically, the plant somatic embryos' used in the methods of the invention have a shoot end and a root end (radicle end). Generally, the shoot end includes one or more cotyledons (leaf-like structures) at some stage of development. Plant embryos suitable for use in the methods of the invention may be from any plant species, such as dicotyledonous or monocotyledonous plants, gymnosperms, etc. Conifer somatic embryos suitable for use in the methods of the invention may be from conifer species, including, but not limited to, loblolly pine somatic embryos and Douglas-fir somatic embryos.

In step (b) of the methods of the invention, the compact plant somatic embryo of step (a) is assembled into a manufactured seed. In addition to a plant embryo, a manufactured seed typically comprises a manufactured seed coat, a gametophyte medium, and a shoot restraint. A "manufactured seed coat" refers to a structure analogous to a natural seed coat that protects the plant embryo and other internal structures of the manufactured seed from mechanical damage, desiccation, from attack by microbes, fungi, insects, nematodes, birds, and other pathogens, herbivores, and pests, among other functions.

The manufactured seed coat may be fabricated from a variety of materials including, but not limited to, cellulosic materials, glass, plastic, moldable plastic, cured polymeric resins, paraffin, waxes, varnishes, and combinations thereof such as a wax-impregnated paper. The materials from which the seed coat is made are generally non-toxic and provide a degree of rigidity. The seed coat can be biodegradable, although typically the seed coat remains intact and resistant to penetration by plant pathogens until after emergence of the germinating embryo.

The manufactured seed coat can include a "shell" that has an opening or orifice that is covered or otherwise occluded by a lid and that contains a plant embryo. Alternatively, in place of an orifice, the shell can include a region that is thin or weakened relative to other regions of the shell. The covered orifice or thinner or weakened portion has a lower burst strength than the rest of the shell. Thus, a germinating embryo generally emerges from the manufactured seed coat by penetrating through the opening or thinner or weaker portion of the shell. The shell is generally sufficiently rigid to provide mechanical protection to the embryo, for example, during sowing, and is substantially impermeable to gases, water, and soil microbes. Typically, the radicle end of the embryo is oriented toward the opening or weaker area of the shell to facilitate protrusive growth of the primary root of the germinating embryo from the manufactured seed.

The seed coat may lack an opening or weakened or thin section, as long as it does not prevent the embryo germinating from within from growing out of the manufactured seed without fatal or debilitating injury to the tissue. To this end, polymeric materials having a high dry strength and low wet strength can be used. The seed coat can also be so constructed that it forms a self-breaking capsule (e.g., a capsule that is melted by depolymerization) or that it breaks apart easily upon application of an outwardly protrusive force from inside the manufactured seed but is relatively resistant to compressive forces applied to the outside of the seed coat (see, e.g., Japanese Patent Application No. JP 59102308; Redenbaugh (1993) In: Redenbaugh (ed.), Synseeds: Application of Synthetic Seeds to Crop Improvement, Chapter 1, CRC Press, Boca Raton, Fla.).

The manufactured seed coat may have two or more layers, each having the same or a different composition. For example, the innermost layer may include a relatively compliant and water-impermeable cellulosic material and the outer layer can comprise a polymeric material having a high dry strength and a low wet strength. Alternatively, the inner layer may include a rigid shape such as an open-ended cylinder, where at least a portion of the open end(s) is covered with an outer-layer material having a high dry strength and a low wet strength.

The manufactured seed coat may comprise a relatively compliant cellulosic or analogous material, shaped to at least partially conform to the shape of the gametophyte medium and/or shoot restraint to be disposed therein. The manufactured seed coat may have at least one tapered end terminating with an orifice, which may be covered with a lid.

Additives such as antibiotics and plant-growth regulators may be added to the manufactured seed coat, for example, by incorporation into the material forming one or more of the layers of the seed coat or by coating or otherwise treating the layer(s) with the additive by conventional means.

As used herein, a "gametophyte medium" refers to a source of nutrients, such as vitamins, minerals, carbon and energy sources, and other beneficial compounds used by the embryo during germination. Thus, the gametophyte medium is analogous to the gametophyte of a natural seed. A gametophyte medium according to the invention may include a substance that causes the medium to be a semisolid or have a congealed consistency under normal environmental condition. Typically, the gametophyte medium is in the form of a hydrated gel. A "gel" is a substance that is prepared as a colloidal solution and that will, or can be caused to, form a semisolid material. Such conversion of a liquid gel solution into a semisolid material is termed herein "curing" or "setting" of the gel. A "hydrated gel" refers to a water-containing gel. Such gels are prepared by first dissolving in water (where water serves as the solvent, or "continuous phase") a hydrophilic polymeric substance (serving as the solute, or "disperse phase") that, upon curing, combines with the continuous phase to form the semisolid material. Thus, the water becomes homogeneously associated with the solute molecules without experiencing any substantial separation of the continuous phase from the disperse phase. However, water molecules can be freely withdrawn from a cured hydrated gel, such as by evaporation or imbibition by a germinating embryo. When cured, these gels have the characteristic of compliant solids, like a mass of gelatin, where the compliance becomes progressively less and the gel becomes more "solid" to the touch as the relative amount of water in the gel is decreased.

In addition to being water-soluble, suitable gel solutes are neither cytotoxic nor substantially phytotoxic. As used herein, a "substantially non-phytotoxic" substance is a substance that does not interfere substantially with normal plant development, such as by killing a substantial number of plant cells, substantially altering cellular differentiation or maturation, causing mutations, disrupting a substantial number of cell membranes or substantially disrupting cellular metabolism, or substantially disrupting other process.

Candidate gel solutes include, but are not limited to, the following: sodium alginate, agar, agarose, amylose, pectin, dextran, gelatin, starch, amylopectin, modified celluloses such as methylcellulose and hydroxyethylcellulose, and polyacrylamide. Other hydrophilic gel solutes can also be used, so long as they possess similar hydration and gelation properties and lack of toxicity.

Gels are typically prepared by dissolving a gel solute, usually in fine particulate form, in water to form a gel solution. Depending upon the particular gel solute, heating is usually necessary, sometimes to boiling, before the gel solute will dissolve. Subsequent cooling will cause many gel solutions to reversibly "set" or "cure" (become gelled). Examples include gelatin, agar, and agarose. Such gel solutes are termed "reversible" because reheating cured gel will re-form the gel solution. Solutions of other gel solutes require a "complexing" agent which serves to chemically cure the gel by crosslinking gel solute molecules. For example, sodium alginate is cured by adding calcium nitrate ($Ca(NO_3)_2$) or salts of other divalent ions such as, but not limited to, calcium, barium, lead, copper, strontium, cadmium, zinc, nickel, cobalt, magnesium, and iron to the gel solution. Many of the gel solutes requiring complexing agents become irreversibly cured, where reheating will not re-establish the gel solution.

The concentration of gel solute required to prepare a satisfactory gel according to the present invention varies depending upon the particular gel solute. For example, a useful concentration of sodium alginate is within a range of about 0.5% w/v to about 2.5% w/v, preferably about 0.9% w/v to 1.5% w/v. A useful concentration of agar is within a range of about 0.8% w/v to about 2.5% w/v, preferably about 1.8% w/v. Gel concentrations up to about 24% w/v have been successfully employed for other gels. In general, gels cured by complexing require less gel solute to form a satisfactory gel than "reversible" gels.

The gametophyte medium typically comprises one or more carbon sources, vitamins, and minerals. Suitable carbon sources include, but are not limited to, monosaccharides, disaccharides, and/or starches. The gametophyte medium may also comprise amino acids, an adsorbent composition, and a smoke suspension. Suitable amino acids may include amino acids commonly found incorporated into proteins as well as amino acids not commonly found incorporated into proteins, such as argininosuccinate, citrulline, canavanine, omithine, and D-steroisomers. Suitable adsorbent compositions include, but are not limited to, charcoal, polyvinyl polypyrolidone, and silica gels. A suitable smoke suspension contains one or more compounds generated through the process of burning organic matter, such as wood or other cellulosic material. Solutions containing these by-products of burning organic matter may be generated by burning organic matter, washing the charred material with water, and collecting the water. Solutions may also be obtained by heating the organic matter and condensing and diluting volatile substances released from such heating. Certain types of smoke suspensions may be purchased from commercial suppliers, for example, Wright's Concentrated Hickory Seasoning Liquid Smoke (B&G foods, Inc. Roseland, N.J. 07068). Smoke suspension may be incorporated into the gametophyte medium in any of various forms. For instance, smoke suspension may be incorporated as an aerosol, a powder, or as activated clay. An exemplary concentration of Wright's Concentrated Hickory Seasoning Liquid Smoke liquid smoke suspension, if present, is between 0.0001 ml and 1 ml of smoke suspension per liter of medium. The gametophyte medium may also include one or more compounds involved in nitrogen metabolism, such as urea or polyamines.

The gametophyte medium may include oxygen-carrying substances to enhance both the absorption of oxygen and the retention of oxygen by the gametophyte medium, thereby allowing the medium to maintain a concentration of oxygen that is higher than would otherwise be present in the medium solely from the absorption of oxygen from the atmosphere. Exemplary oxygen-carrying substances are described in U.S. Pat. No. 5,564,224 (e.g., Column 9, line 44, to Column 11, line 67), herein incorporated by reference.

The gametophyte medium may also contain hormones. Suitable hormones include, but are not limited to, abscisic acid, cytokinins, auxins, and gibberellins. Abscisic acid is a sesquiterpenoid plant hormone that is implicated in a variety of plant physiological processes (see, e.g., Milborrow (2001) *J. Exp. Botany* 52: 1145-1164; Leung & Giraudat (1998) *Ann. Rev. Plant Physiol. Plant Mol. Biol.* 49: 199-123). Auxins are plant growth hormones that promote cell division and growth. Exemplary auxins for use in the germination medium include, but are not limited to, 2,4-dichlorophenoxyacetic acid, indole-3-acetic acid, indole-3-butyric acid, naphthalene acetic acid, and chlorogenic acid. Cytokinins are plant growth hormones that affect the organization of dividing cells. Exemplary cytokinins for use in the germination medium include, but are not limited to, e.g., 6-benzylaminopurine, 6-furfurylaminopurine, dihydrozeatin, zeatin, kinetin, and zeatin riboside. Gibberellins are a class of diterpenoid plant hormones (see, e.g., Krishnamoorthy (1975) Gibberellins and Plant Growth, John Wiley & Sons). Representative examples of gibberellins useful in the practice of the present invention include gibberellic acid, gibberellin 3, gibberellin 4, and gibberellin 7. An example of a useful mixture of gibberellins is a mixture of gibberellin 4 and gibberellin 7 (referred to as gibberellin 4/7), such as the gibberellin 4/7 sold by Abbott Laboratories, Chicago, Ill.

When abscisic acid is present in the gametophyte medium, it is typically used at a concentration in the range of from about 1 mg/L to about 200 mg/L. When present in the gametophyte medium, the concentration of gibberellin(s) is typically between about 0.1 mg/L and about 500 mg/L. Auxins may be used, for example, at a concentration of from 0.1 mg/L to 200 mg/L. Cytokinins may be used, for example, at a concentration of from 0.1 mg/L to 100 mg/L.

Exemplary gametophyte media are described in U.S. Pat. No. 5,687,504 (e.g., Column 8, line 63, to Column 9, line 41) and in U.S. application Ser. No. 10/371,612, herein incorporated by reference. A representative gametophyte medium is KE64, the composition of which is set forth in Table 1 below.

As used herein, a "shoot restraint" refers to a porous structure within a manufactured seed with an interior surface for contacting and surrounding at least the shoot end of a plant embryo and that resists penetration by the shoot end during germination. The shoot restraint prevents the shoot end of the embryo, such as the cotyledons, from growing into and becoming entrapped in the gametophyte medium. The shoot restraint is porous to allow access of the embryo to water, nutrients, and oxygen. The shoot restraint may be fabricated from any suitable material, including, but not limited to, glassy, metal, elastomeric, ceramic, clay, plaster, cement, starchy, putty-like, synthetic polymeric, natural polymeric, and adhesive materials. Exemplary shoot restraints are described in U.S. Pat. No. 5,687,504 (e.g., Column 3, line 61, to Column 4, line 13; Column 18, line 7, to Column 22, line 2), herein incorporated by reference.

In the methods of the invention, all or only part of the plant somatic embryo may be inserted into the shoot restraint. Typically, at least the shoot end of the somatic embryo is inserted into the shoot restraint. As described above, the methods of the invention for improving germination of manufactured seeds comprise reducing the size of the plant embryo before it is inserted into the shoot restraint. The reduction in size produces a compact embryo that may be more easily inserted into the shoot restraint. Moreover, compact embryos may be able to fit deeper into the shoot restraint and may subsequently plump up to resume their original dimensions. The surface area of nutrient uptake in a manufactured seed is limited to the area of the plant embryo that is in direct contact with the interior surface of the shoot restraint. During germination of plant embryos, the cotyledons have been found to be the primary organs for nutrient uptake (Brown & Gifford (1958) *Plant Physiol.* 33:57-64). Without being bound to any particular theory of operation, the methods of the invention may create an environment where more of the surface area of the embryo is in contact with the interior surface of the shoot restraint, increasing the surface area available for the uptake of nutrients and thereby improving germination.

Either the interior surface of the shoot restraint or the somatic embryo, or both, may be contacted with a hydrated gel either before or after inserting the embryo into the shoot restraint. Exemplary embodiments of hydrated gels are as described above for the gametophyte medium. The hydrated gel may comprise only gel solutes and water, or it may comprise plant nutrients and other substances, as described for the gametophyte medium.

In some embodiments, the interior surface of the shoot restraint may be contacted with a hydrated gel solution that will cure to form a hydrated gel. A cavity may then be made into the hydrated gel in the shoot restraint and the somatic embryo inserted into the cavity in the hydrated gel in the shoot restraint. In addition or alternatively, at least a portion of somatic embryo (such as the cotyledons) may be contacted with a hydrated gel solution that will cure to form a hydrated gel before inserting the embryo into the shoot restraint. In some embodiments, the interior surface of the shoot restraint and/or the somatic embryo may be contacted with the hydrated gel after the embryo is inserted into the shoot restraint. For example, a hydrated gel solution may be added to the shoot restraint after the somatic embryo is inserted into the shoot restraint.

The shoot restraint may be inserted into the seed coat comprising the gametophyte medium before or after inserting the somatic embryo into the shoot restraint. The manufactured seeds may then be cultured under conditions suitable for germination of the somatic embryo. Conditions suitable for germination of manufactured seeds are standard in the art and include conditions suitable for germination of natural seeds. For example, the manufactured seeds may be sown in any of a variety of environments, such as in sand, vermiculite, sterile soil, and/or in the field (natural soil). For example, sterile Coles™ washed sand, which is available from a variety of gardening supply stores, may be used. Exemplary conditions suitable for germination of the somatic embryo in manufactured seeds are described in EXAMPLE 1.

The methods of the invention improve the germination of manufactured seeds, as shown in EXAMPLE 2. Moreover, the percentage of normal germinants as well as the lengths of the radicles are significantly increased, as shown in EXAMPLE 2.

The term "normal germinant" or "normalcy" denotes the presence of all expected parts of a plant at time of evaluation. The expected parts of a plant may include a radicle, a hypocotyl, one or more cotyledon(s), and an epicotyl. The term "radicle" refers to the part of a plant embryo that develops into the primary root of the resulting plant. The term "cotyledon" refers generally to the first, first pair, or first whorl (depending on the plant type) of leaf-like structures on the plant embryo that function primarily to make food compounds in the seed available to the developing embryo, but in some cases act as food storage or photosynthetic structures. The term "hypocotyl" refers to the portion of a plant embryo or seedling located below the cotyledons but above the radicle. The term "epicotyl" refers to the portion of the seedling stem that is above the cotyledons. In the case of gymnosperms, normalcy is characterized by the radicle having a length greater than 3 mm and no visibly discernable malformations compared to the appearance of embryos germinated from natural seed. It is important to note that, as long as all parts of an embryo have germinated, the corresponding germinant probably has the potential to become a normal seedling. There is no reason to believe that any malformations observed in EXAMPLE 2 are fatal to germinants. Noting the quantity and quality of malformation is a convenient way to comparatively evaluate the various methods and means employed for making manufactured seeds. Fortunately, plant embryonic tissue is exquisitely sensitive to non-natural conditions and manifests that sensitivity in ways discernable to a trained observer.

The following examples merely illustrate the best mode now contemplated for practicing the invention, but should not be construed to limit the invention.

EXAMPLE 1

This Example shows a general method for assembling plant embryos into manufactured seeds and germinating manufactured seeds.

Representative methods used for making manufactured seeds are described in U.S. Pat. No. 6,119,395 (e.g., Column 4, line 60, to Column 8, line 35), U.S. Pat. No. 5,701,699 (e.g., Column 7, line 47, to Column 10, line 35), and U.S. Pat. No. 5,427,593 (e.g., Column 4, lines 24-54; Column 12, line 33, to Column 16, line 28; Column 19, line 1, to Column 22, line 9), incorporated herein by reference. Seed coats were made by plunging paper straw segments into a molten wax formulation. The segments were removed, excess wax drained and the remaining wax allowed to solidify. Ceramic shoot restraints were made by injecting a porcelain slip into a preformed mold with a pin in the center to create the shoot accepting cavity. The slip was allowed to dry to a consistency that allowed removal of the preformed restraint. The restraint was subsequently heated to a temperature that allows the porcelain to form a porous but fused structure. The restraint was then acid washed to remove impurities. Lids were made by pre-stretching Parafilm™ (Pechiney Plastic Packaging, Chicago, Ill. 60631).

The gametophyte medium KE64 (see Table 1) was prepared from pre-made stocks. The required amount of each stock solution (that is not heat-labile) was added to water. Non-stock chemicals (such as charcoal, and agar) were weighed out and added directly to the solution. After all the non-heat-labile chemicals and compounds were added, the medium was brought up to an appropriate volume and the pH was adjusted. The medium was then sterilized by autoclaving. Filter-sterilized heat-labile components (such as sucrose, amino acids, and vitamins) were added after the medium had cooled.

Manufactured seed were assembled by placing a cotyledon restraint on a flat "puck". A pre-made seedcoat was then placed over the restraint and the unit dipped in molten wax to seal the two units together. The wax was then allowed to solidify and the resulting seedcoat was filled with gametophyte medium via a positive displacement pump. The gametophyte media was then allowed to solidify and the seed was removed from the flat "puck". The open end (non-embryo containing end) was then sealed by dipping in molten wax. After the somatic embryos were inserted into the shoot restraints, as described in EXAMPLE 2, the seeds were sealed by laying lids over the open end of the manufactured seed and fusing the lids to the surface with heat. The manufactured seeds were then swabbed with anti-microbial agents.

A suitable amount of sterile sand was prepared by baking 2 liters of sand at a temperature of 375° F. for 24 hours. The sand was then added to pre-sterilized trays and 285 ml water was added. Furrows were then formed and the box was sealed. The box containing the sand was then autoclaved for 1 hour at 121° C. and 1 atmospheric pressure.

The manufactured seeds were sown in the sand and allowed to germinate for at least 49 days in a growth chamber under continuous light at room temperature (23° C.).

TABLE 1

Composition of Media for Manufactured Seeds

| Constituent | KE64 (mg/l) | 185/20 (mg/l) |
|---|---|---|
| $NH_4NO_3$ | 301.1 | 206.25 |
| $(NH_4)_2MoO_4$ | 0.06 | |
| $KNO_3$ | | 1170 |
| $MgSO_4 \cdot 7H_2O$ | 1000 | 185 |
| $KH_2PO_4$ | 1800 | 85 |
| $CaCl_2 \cdot 2H_2O$ | 299.2 | 220 |
| KI | | 0.415 |
| $H_3BO_3$ | 10.0 | 3.1 |
| $MnSO_4 \cdot H_2O$ | | 8.45 |
| $MnCl_2 \cdot 4H_2O$ | 6.0 | |
| $ZnSO_4 \cdot 7H_2O$ | 0.8 | 4.3 |
| $Na_2MoO_4 \cdot 2H_2O$ | | 0.125 |
| $CuSO_4 \cdot 5H_2O$ | | 0.0125 |
| $CuCl_2 \cdot 2H_2O$ | 0.5 | |
| $CoCl_2 \cdot 6H_2O$ | | 0.0125 |
| $FeSO_4 \cdot 7H_2O$ | | 13.925 |
| Ferric citrate | 60 | |
| $Na_2EDTA$ | | 18.625 |
| Nicotinic acid | 1 | 0.5 |
| Pyridoxine•HCl | 0.25 | 0.5 |
| Thiamine•HCl | 1 | 1 |
| Glycine | | 2 |
| Myo-Inositol | 100 | 100 |
| Riboflavin | 0.125 | |
| Ca-pantothenate | 0.5 | |
| Biotin | 0.001 | |
| Folic Acid | 0.125 | |
| L-asparagine | 106.7 | |
| L-glutamine | 266.7 | |
| L-lysine•$2H_2O$ | 53.3 | |
| DL-serine | 80 | |
| L-proline | 53.3 | |
| L-arginine•HCl | 266.7 | |
| L-valine | 53.3 | |
| L-alanine | 53.3 | |
| L-leucine | 80 | |
| L-threonine | 26.7 | |
| L-phenylalanine | 53.3 | |
| L-histidine | 26.7 | |
| L-tryptophan | 26.7 | |
| L-isoleucine | 26.7 | |
| L-methionine | 26.7 | |
| L-glycine | 53.3 | |
| L-tyrosine | 53.3 | |
| L-cysteine | 26.7 | |
| Urea | 800 | |
| Sucrose | 50 | 50 |
| Agar | 18 | 18 |
| Charcoal | 2.5 | 2.5 |
| | | pH adjusted to 5.7 |

EXAMPLE 2

This Example shows a representative method of the invention for improving the germination of manufactured seeds containing loblolly pine somatic embryos.

Methods: Manufactured seeds were assembled as described in EXAMPLE 1. Loblolly pine somatic embryos were obtained as previously described (see, e.g., U.S. Pat. Nos. 4,957,866; 5,034,326; 5,036,007; 5,041,382; 5,236,841; 5,563,061 and 5,821,126). After cold treatment for 4 weeks at 6-8° C. as previously described (U.S. Patent Application Publication No. 2005-0026281, paragraph 57, hereby incorporated by reference), embryos were singulated onto filter paper and placed in a high humidity environment (over 1000 ml of water) at room temperature (23° C.) for three weeks (conditioning over water).

After conditioning over water, one set of somatic embryos were rehydrated as described below. Embryo widths and lengths at various points of the development process were measured using an ocular micrometer in a stereomicroscope under appropriate magnification. The moisture content of the embryos was measured by obtaining initial weights at the end of the high humidity treatment followed by oven-dried weights following 24 hours of drying at 60° C.

After conditioning over water, another set of somatic embryos were subjected to one the following treatments:

1. The filter paper with the embryos on it was placed in a Petri plate containing 185/20 medium (Table 1). The embryos were allowed to imbibe overnight and then inserted into manufactured seed.

2. The filter paper with the embryos on it was placed on a clean, sterile Petri plate. From the Petri plate, the embryos were inserted into manufactured seed.

There were 6 replicates for each treatment using loblolly pine somatic embryos. Nine seeds were used for each replicate. The manufactured seeds were sealed and germinated as described in EXAMPLE 1.

Results: The mean lengths and widths of embryos at different time points of the development process are shown in Table 2.

TABLE 2

Length and Width Changes of Embryos at Different Time Points

| Time Point | Mean Length (Standard Deviation) | Mean Width (Standard Deviation) |
|---|---|---|
| End of Development | 3.2 mm (0.45) | 2.0 mm (0.56) |
| End of Cold Treatment | 3.1 mm (0.52) | 1.9 mm (0.45) |
| End of Conditioning Over Water | 2.5 mm (0.6) | 1.2 mm (0.7) |
| End of Rehydration | 3.2 mm (0.4) | 1.6 mm (0.8) |

As shown in Table 2, conditioning over water (treatment 2) reduced the mean length and the mean width of the embryos by about 19% and about 37%, respectively. The moisture content of the embryos after conditioning over water is generally between about 60% to 80%. For example, the moisture content of a different batch of embryos with the same genotype was determined to be 72.6% (4.7% standard deviation).

The percentages of manufactured seeds in four germination categories were assessed at 49 days past sowing: (1) full germination, (2) partial germination, (3) no germination, and (4) upside down germination (root initial damage). The results are shown in Table 3.

TABLE 3

Percentages of Germinants in Each Germination Category

| Treatment | Full Germination $\alpha = 0.0012^1$ | Partial Germination $\alpha = 0.0031^1$ | No Germination $\alpha = 0.0012^1$ | Root Initial Damage $\alpha = <0.0001^1$ |
|---|---|---|---|---|
| 1 | 13.0%$^{A, C}$ | 13.0%$^{A, B}$ | 12.9%$^{A, B}$ | 61.1%$^{A}$ |
| 2 | 31.5%$^{A, B}$ | 24.0%$^{A, B}$ | 16.7%$^{A, B}$ | 31.5%$^{B, C}$ |

[1] Means followed by the same letter not significantly different.

Table 4 shows the percentages of germinants in each normalcy category. Normalcy refers to the presence of all expected parts of a plant (i.e., radicle, hypocotyl, cotyledon (s), epicotyl) at time of evaluation. A normal germinant was defined as having a radicle with a length greater than 3 mm and no visibly discernable malformations compared to the appearance of embryos germinated from natural seed. The normalcy categories assessed were: (1) normal germinants, (2) would be normal if fully extracted from seed, (3) not normal, and (4) unchanged (no visible elongation).

TABLE 4

Percentages of Germinants in Each Normalcy Category

| Treatment | Normal $\alpha = <0.0001^1$ | Would Be Normal if Fully Extracted $\alpha = 0.5076^1$ | Not Normal $\alpha = <0.0001^1$ | Unchanged $\alpha = 0.4381^1$ |
|---|---|---|---|---|
| 1 | 13.0%$^{A, D}$ | 5.5% | 75.9%$^{B, C}$ | 3.7% |
| 2 | 31.5%$^{B, E}$ | 7.4% | 44.4%$^A$ | 1.9% |

$^1$Means followed by the same letter not significantly different.

Table 5 shows the lengths of radicles, hypocotyls, and cotyledons at 49 days past sowing.

TABLE 5

Average Organ Lengths of Germinants

| Treatment | Radicle Length (cm) $\alpha = 0.0488^1$ | Hypocotyl Length (cm) $\alpha = <0.0031^1$ | Cotyledon Length (cm) $\alpha = 0.0012^1$ |
|---|---|---|---|
| 1 | 0.92$^B$ | 2.09$^B$ | 0.78$^{A, C}$ |
| 2 | 1.91$^A$ | 1.83$^{A, B, C}$ | 0.74$^{A, C}$ |

$^1$Means followed by the same letter not significantly different.

These results indicate that inserting somatic embryos into manufactured seed directly after conditioning over water improves the germination of manufactured seeds (treatment 2), compared to first culturing the embryos on 185/20 medium (treatment 1). Treatment 2 also resulted in significantly greater normalcy and radicle lengths of germinants.

Insertion of embryos into manufactured seed directly after conditioning may create an environment where a greater amount of the surface area of the embryo is in contact with the walls of the restraint, for the following reason. After conditioning over water, embryos are smaller and more compact, due to the slight water loss during conditioning. After placing the embryos on 185/20 medium, they return to their pre-conditioning size. Because embryos after the conditioning over water are not as wide, they fit deeper into the restraint. Theoretically, the embryos plump once in the seed. Due to the confined space deeper in the restraint, more of the surface area of the embryo would come in contact with the interior walls of the restraint, making a larger surface area of the embryo cotyledons available for nutrient uptake.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for improving germination of a manufactured seed, comprising the steps of:
   (a) incubating a conifer somatic embryo sufficiently developed to have a shoot end and a root end, at a humidity of between about 90% and about 99.5%, for between about 7 days and 20 days, to reduce the size of the embryo to produce a compact conifer somatic embryo; and
   (b) assembling the compact conifer somatic embryo of step (a) into a manufactured seed.

2. The method of claim 1, wherein the length of the conifer somatic embryo is reduced by about 10% to 50%.

3. The method of claim 1, wherein the width of the conifer somatic embryo is reduced by about 10% to 50%.

4. The method of claim 1, wherein the moisture content of the compact conifer somatic embryos is above 60%.

5. The method of claim 1, wherein the conifer somatic embryo is a loblolly pine somatic embryo.

* * * * *

UNITED STATES PATENT AND TRADEMARK OFFICE
CERTIFICATE OF CORRECTION

PATENT NO.      : 7,654,037 B2
APPLICATION NO. : 11/402119
DATED           : February 2, 2010
INVENTOR(S)     : Jeffrey E. Hartle It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 772 days.

Signed and Sealed this

Twenty-third Day of November, 2010

David J. Kappos
*Director of the United States Patent and Trademark Office*